(12) United States Patent
Watanabe et al.

(10) Patent No.: US 11,913,900 B2
(45) Date of Patent: Feb. 27, 2024

(54) SENSOR ELEMENT

(71) Applicant: NGK INSULATORS, LTD., Nagoya (JP)

(72) Inventors: Yusuke Watanabe, Nagoya (JP); Mika Kai, Nagoya (JP); Ryo Onishi, Nagoya (JP); Saki Suzuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/740,789

(22) Filed: May 10, 2022

(65) Prior Publication Data

US 2022/0268727 A1 Aug. 25, 2022

Related U.S. Application Data

(62) Division of application No. 16/522,720, filed on Jul. 26, 2019, now Pat. No. 11,360,043.

(30) Foreign Application Priority Data

Aug. 3, 2018 (JP) .................................. 2018-146710

(51) Int. Cl.
*G01N 27/41* (2006.01)
*G01N 27/407* (2006.01)
(52) U.S. Cl.
CPC .......... *G01N 27/41* (2013.01); *G01N 27/4077* (2013.01)
(58) Field of Classification Search
CPC . G01N 27/41; G01N 27/4077; G01N 27/4074
See application file for complete search history.

(56) References Cited

U.S. PATENT DOCUMENTS 9,512,770 B2 12/2016 Oya
2012/0211362 A1 8/2012 Onkawa
(Continued)

FOREIGN PATENT DOCUMENTS

JP 2012168030 A 9/2012
JP 2015-087161 A 5/2015
(Continued)

OTHER PUBLICATIONS

U.S. Appl. No. 16/522,715, filed Jul. 26, 2019.
(Continued)

*Primary Examiner* — Joshua L Allen
(74) *Attorney, Agent, or Firm* — MATTINGLY & MALUR, PC

(57) ABSTRACT

A sensor element includes: an element base including: a ceramic body made of an oxygen-ion conductive solid electrolyte, and having an inlet at one end portion thereof; at least one internal chamber located inside the ceramic body, and communicating with the inlet under predetermined diffusion resistance; an electrochemical pump cell including an electrode located on an outer surface of the ceramic body, an electrode facing the internal chamber, and a solid electrolyte located therebetween; and a heater buried in the ceramic body; and a porous leading-end protective layer surrounding a first range at least including a leading end surface and a region to be coped with water-induced cracking specified in advance. A single heat insulating space is interposed between the leading-end protective layer and a whole side surface of the element base at least in the above region.

20 Claims, 9 Drawing Sheets

(56) References Cited

U.S. PATENT DOCUMENTS

| | | | | |
|---|---|---|---|---|
| 2014/0291150 A1* | 10/2014 | Otsuka | ............... | G01N 27/4077 |
| | | | | 204/424 |
| 2015/0075254 A1 | 3/2015 | Sakuma | | |
| 2015/0114085 A1 | 4/2015 | Iwano et al. | | |
| 2015/0355142 A1 | 12/2015 | Murakami | | |
| 2016/0054256 A1 | 2/2016 | Sakuma et al. | | |
| 2016/0282300 A1* | 9/2016 | Hino | .................. | G01N 33/0037 |

FOREIGN PATENT DOCUMENTS

| | | |
|---|---|---|
| JP | 2016-048230 A | 4/2016 |
| JP | 2016-188853 A | 11/2016 |
| JP | 2016-188855 A | 11/2016 |

OTHER PUBLICATIONS

U.S. Appl. No. 16/522,718, filed Jul. 26, 2019.
Kato et al. (JP 2012168030 A, machine translation) (Year: 2012).
Chinese Office Action received in corresponding Chinese Application No. 201910699209.4 dated Dec. 29, 2022.

\* cited by examiner

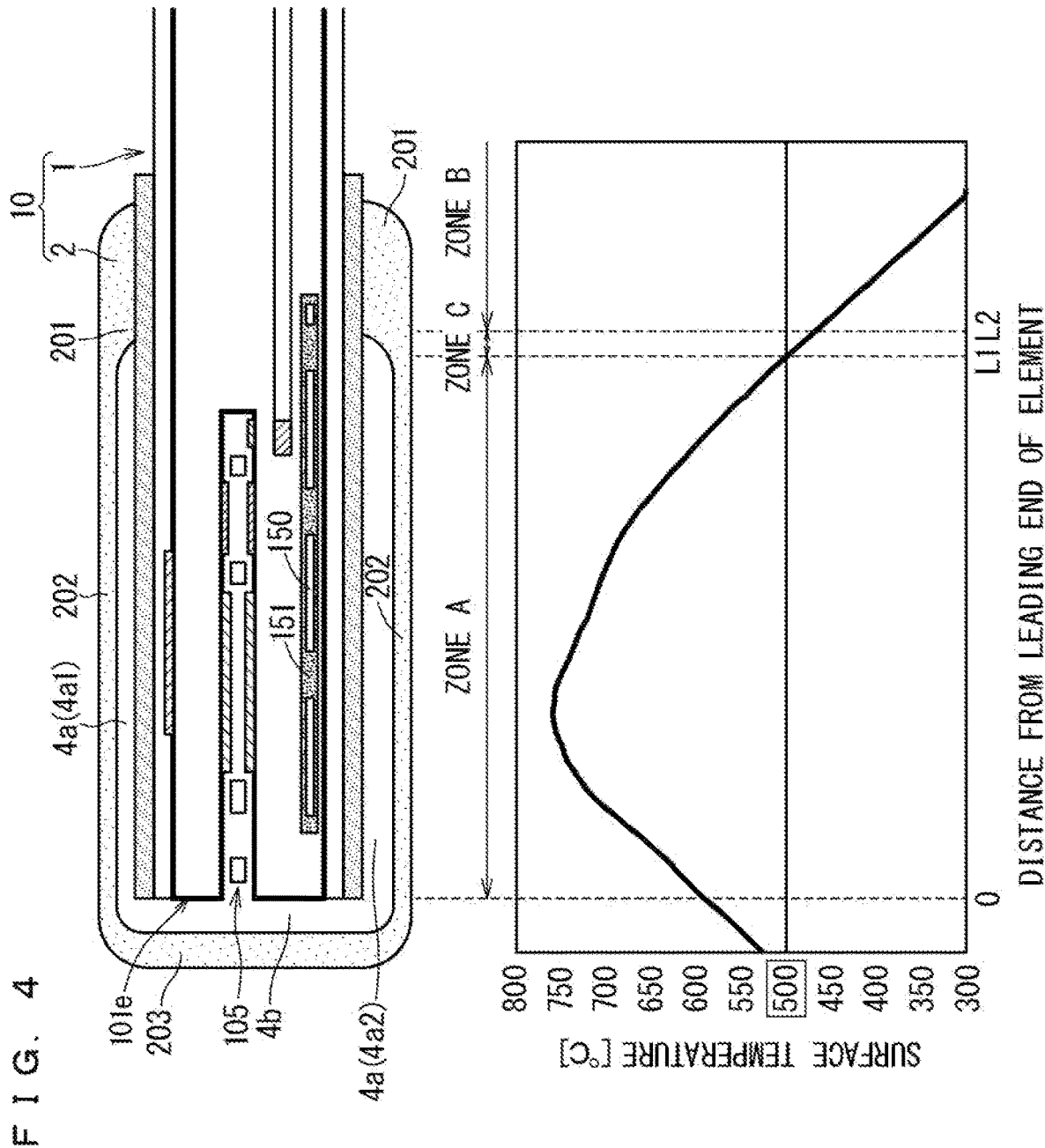
F I G. 4

SENSOR ELEMENT

BACKGROUND OF THE INVENTION

Field of the Invention

The present invention relates to a gas sensor detecting a predetermined gas component in a measurement gas, and, in particular, to a configuration for preventing water-induced cracking of a sensor element included in the gas sensor.

Description of the Background Art

As a gas sensor for determining concentration of a desired gas component in a measurement gas, a gas sensor that includes a sensor element made of an oxygen-ion conductive solid electrolyte, such as zirconia ($ZrO_2$), and including some electrodes on the surface and the inside thereof has been widely known. Such a sensor element includes a protective layer formed of a porous body (porous protective layer) to prevent cracking of the sensor element (more particularly, an element base) occurring due to thermal shock caused by adherence of water droplets, which is so-called water-induced cracking. The extent of the effect of preventing the water-induced cracking is also referred to as water resistance.

As such a sensor element, a sensor element including protective layers provided on opposite main surfaces of an elongated planar element base, and further including a porous protective layer provided to a leading end portion has already been known (see Japanese Patent Application Laid-Open No. 2016-48230, for example).

A sensor element including a porous protective layer formed at a leading end portion of an elongated planar element base to have a space between the layer and an element has also already been known (see Japanese Patent Application Laid-Open No. 2016-188853 and Japanese Patent Application Laid-Open No. 2015-87161, for example).

Japanese Patent Application Laid-Open No. 2016-48230 discloses that forming the porous protective layer in a region, of the leading end portion of the sensor element, in a temperature state of 500° C. or more when the gas sensor is in use while not forming the porous protective layer in a region in a temperature state of 300° C. or less when the gas sensor is in use can reduce power consumption and a waiting time until detection due to reduction in area of formation of the porous protective layer, and can achieve suppression of cracking due to improvement in water resistance.

The sensor element according to Japanese Patent Application Laid-Open No. 2016-48230, however, does not necessarily have sufficient water resistance, and is subject to water-induced cracking in a case where the amount of water exposure is large.

Japanese Patent Application Laid-Open No. 2016-188853 discloses a sensor element including a porous protective layer adhering to one leading end surface of an element base while having a space between the layer and a side surface perpendicular to the leading end surface of the element base. This configuration is effective in terms of weakening thermal conduction from the porous protective layer to the element base.

Japanese Patent Application Laid-Open No. 2016-188853 schematically discloses a positional relationship between a portion of the sensor element in which the temperature becomes high when the gas sensor is in use and the space, but fails to particularly disclose the relationship between temperature distribution of the sensor element when the gas sensor is in use and the shape and placement of the porous protective layer. Water resistance may thus not sufficiently be secured in a case where the configuration disclosed in Japanese Patent Application Laid-Open No. 2016-188853 is adopted. In the sensor element disclosed in Japanese Patent Application Laid-Open No. 2016-188853, the porous protective layer is provided to be directly joined to a dense solid electrolyte layer. With the configuration disclosed in Japanese Patent Application Laid-Open No. 2016-188853, adhesion of the porous protective layer to the side surface of the element base is not necessarily secured, and delamination and, further, detachment of the porous protective layer may occur. The occurrence of such delamination and detachment is not preferable as it impairs water resistance of the sensor element as originally assumed.

On the other hand, forming a space only in a corner portion at one end portion of the sensor element as disclosed in Japanese Patent Application Laid-Open No. 2015-87161 is not preferable as water-induced cracking may occur in a portion in which the temperature becomes high when the gas sensor is in use but no space is provided.

SUMMARY

The present invention relates to a gas sensor detecting a predetermined gas component in a measurement gas, and is, in particular, directed to prevention of water-induced cracking of a sensor element included in the gas sensor.

According to the present invention, a sensor element for a gas sensor detecting a predetermined gas component in a measurement gas includes: an element base including: an elongated planar ceramic body made of an oxygen-ion conductive solid electrolyte, and having a gas inlet at one end portion thereof; at least one internal chamber located inside the ceramic body, and communicating with the gas inlet under predetermined diffusion resistance; at least one electrochemical pump cell including an outer pump electrode located on an outer surface of the ceramic body, an inner pump electrode located to face the at least one internal chamber, and a solid electrolyte located between the outer pump electrode and the inner pump electrode, the at least one electrochemical pump cell pumping in and out oxygen between the at least one internal chamber and an outside; a heater buried in a predetermined range on a side of the one end portion of the ceramic body; and a first region to be coped with water-induced cracking defined in the element base on a side of the one end portion; and a first leading-end protective layer being porous, and surrounding a first range at least including a leading end surface and the first region of the element base on the side of the one end portion, wherein a single heat insulating space is interposed between the first leading-end protective layer and a whole side surface of the element base at least in the first region.

The sensor element having greater water resistance than that of a conventional sensor element can thereby be achieved.

The sensor element according to the present invention preferably further includes a second leading-end protective layer being porous, having a larger porosity than the first leading-end protective layer, and located on the whole side surface of the element base at least in the first range, wherein an end portion of the first leading-end protective layer opposite the one end portion is a fixed portion in which the first leading-end protective layer is fixed to the second leading-end protective layer.

The sensor element in which delamination and, further, detachment of the first leading-end protective layer have suitably been suppressed can thereby be achieved.

More preferably, the first leading-end protective layer is further fixed to the leading end surface of the element base on the side of the one end portion, and the single heat insulating space is present only between the first leading-end protective layer and the side surface of the element base in the first range surrounded by the first leading-end protective layer.

In this case, the sensor element in which delamination and, further, detachment of the first leading-end protective layer have more surely and suitably been suppressed compared with a case where the first leading-end protective layer is fixed to the second leading-end protective layer only on the side surface of the element base can thereby be achieved.

It is thus an object of the present invention to provide a sensor element including a porous protective layer on a side of one end portion at which an inlet for a measurement gas is provided, and having greater water resistance than that of a conventional sensor element.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates an example of the relationship between a configuration of the sensor element 10 and a temperature profile of the sensor element 10 when the sensor element 10 is heated by a heater 150 in accordance with a predetermined control condition when the sensor element 10 is in use;

DESCRIPTION OF THE PREFERRED EMBODIMENTS

First Embodiment

<Overview of Sensor Element and Gas Sensor>

Figure 1:
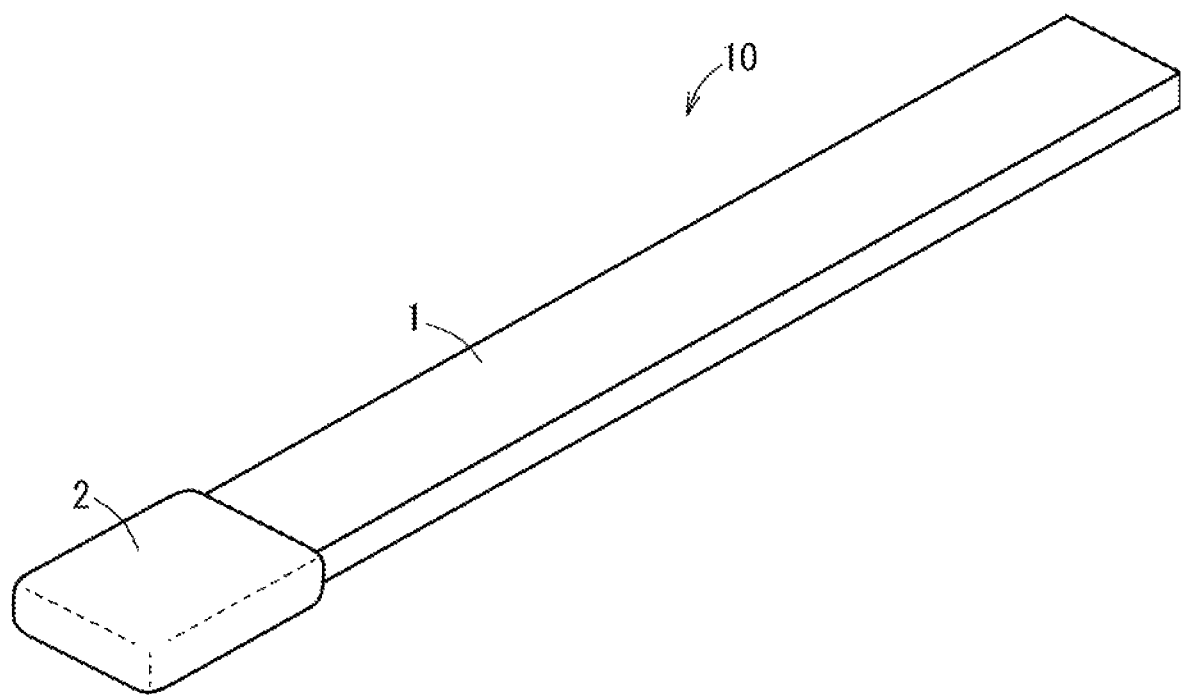
FIG. 1 is a schematic external perspective view of a sensor element 10 according to a first embodiment.
Figure 2:
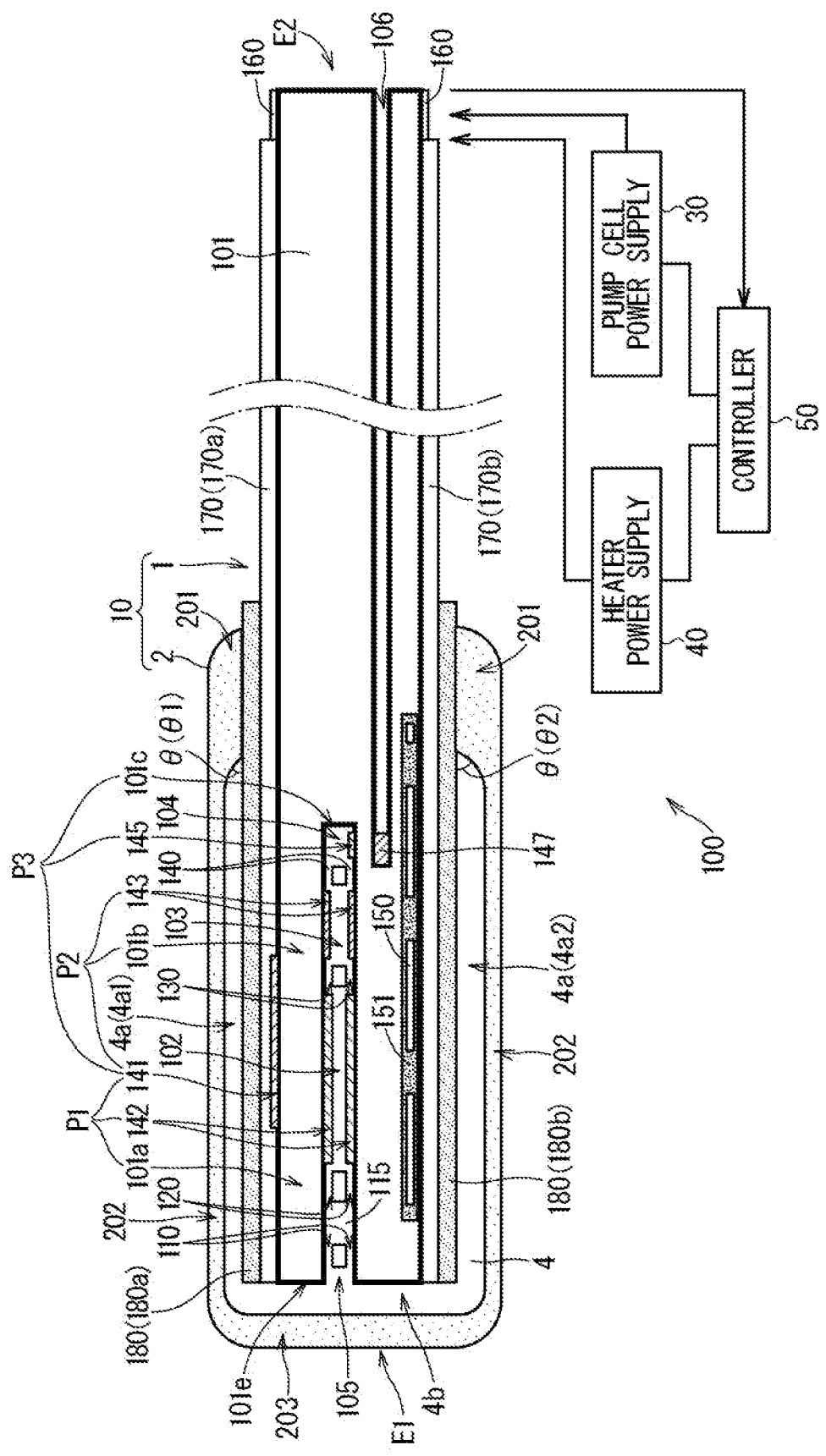
FIG. 2 is a schematic diagram illustrating a configuration of a gas sensor 100 including a sectional view taken along a longitudinal direction of the sensor element 10.

FIG. 1 is a schematic external perspective view of a sensor element (gas sensor element) 10 according to a first embodiment of the present invention. FIG. 2 is a schematic diagram illustrating a configuration of a gas sensor 100 including a sectional view taken along a longitudinal direction of the sensor element 10. The sensor element 10 is a main component of the gas sensor 100 detecting a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous outer leading-end protective layer (first leading-end protective layer) 2.

As illustrated in FIG. 2, the element base 1 includes an elongated planar ceramic body 101 as a main structure, and main surface protective layers 170 are provided on two main surfaces of the ceramic body 101, and, further, inner leading-end protective layers (second leading-end protective layers) 180 are provided outside four side surfaces (on an outer periphery other than a leading end surface 101e) on a side of the one end portion. In addition, the sensor element 10 includes the outer leading-end protective layer 2 provided further outside the inner leading-end protective layers 180. The outer leading-end protective layer 2, however, is provided so that a space (heat insulating space) 4 is interposed between the outer leading-end protective layer 2 and the element base 1. The four side surfaces of the sensor element 10 (or the element base 1, or the ceramic body 101) other than opposite end surfaces in the longitudinal direction thereof are hereinafter simply referred to as side surfaces of the sensor element 10 (or the element base 1, or the ceramic body 101). The leading end surface 101e of the ceramic body 101 is also referred to as the leading end surface 101e of the element base 1.

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the outer leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An external pump electrode 141 is provided on an outer surface of the ceramic body 101, and an internal pump electrode 142 is provided in the first internal chamber 102. Furthermore, an auxiliary pump electrode 143 is provided in the second internal chamber 103, and a measurement electrode 145 is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have an approximately constant oxygen concentration by a pumping action (pumping in or out of oxygen) of a main pump cell P1, and then introduced into the second internal chamber 103. The main pump cell P1 is an electrochemical pump cell including the external pump electrode 141, the internal pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2 that is also an electrochemical pump cell, so that the measurement gas is in a sufficiently low oxygen partial pressure state. The auxiliary pump cell P2 includes the external pump electrode 141, the auxiliary pump electrode 143, and a ceramic layer 101b that is a portion of the ceramic body 101 existing between these electrodes.

The external pump electrode 141, the internal pump electrode 142, and the auxiliary pump electrode 143 are each formed as a porous cermet electrode (e.g., a cermet electrode made of $ZrO_2$ and Pt that contains Au of 1%). The internal pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in the atmosphere in the third internal chamber 104. During the reduction or decomposition, a potential difference between the measurement electrode 145 and the reference electrode 147 is maintained constant. Oxygen ions generated by the above-mentioned reduction or composition are pumped out of the element by a measurement pump cell P3. The measurement pump cell P3 includes the external pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in the atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying voltage necessary for pumping across electrodes included in each of the pump cells. In a case of the measurement pump cell P3, voltage is applied across the external pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the external pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, detecting the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 to at least a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 becomes 500° C. or more. In some cases, the sensor element 10 is heated so that the temperature of the gas distribution part as a whole from the gas inlet 105 to the third internal chamber 104 becomes 500° C. or more. These are to enhance the oxygen-ion conductivity of the solid electrolyte forming each pump cell and to desirably demonstrate the ability of each pump cell. In this case, the temperature in the vicinity of the first internal chamber 102, which becomes the highest temperature, becomes approximately 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are provided on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a, 170b) on the pump surface and the heater surface of the ceramic body 101. The main surface protective layers 170 are layers made of alumina, having a thickness of approximately 5 µm to 30 µm, and including pores with a porosity of approximately 20% to 40%, and are provided to prevent adherence of any foreign matter and poisoned substances to the main surfaces (the pump surface and the heater surface) of the ceramic body 101 and the external pump electrode 141 provided on the pump surface. The main surface protective layer 170a on the pump surface thus functions as a pump electrode protective layer for protecting the external pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the external pump electrode 141 on the side of the one end portion E1 compared with the case illustrated in FIG. 2. The main surface protective layers 170, however, are provided, on the pump surface and the heater surface, at least in a range in which the inner leading-end protective layers 180 are formed.

On the side of the one end portion E1 of the element base 1 included in the sensor element 10, the above-mentioned inner leading-end protective layers 180 are further provided outside the side surfaces (on the outer periphery other than the leading end surface 101e on which the gas inlet 105 is provided). The inner leading-end protective layers 180 are porous layers made of alumina, having a relatively large porosity of 30% to 50%, and having a thickness of 20 µm to 50 µm.

The inner leading-end protective layers 180 have a role of preventing poisoning and exposure to water of the sensor element 10 along with the outer leading-end protective layer 2 and the main surface protective layers 170. For example, the inner leading-end protective layers 180 have higher heat insulating properties than those of the outer leading-end protective layer 2 and the main surface protective layers 170 as they have a larger porosity, and this contributes to improvement in water resistance of the sensor element 10.

The inner leading-end protective layers 180 also have a role as underlying layers when the outer leading-end protective layer 2 is formed with respect to the element base 1. It is only required that the inner leading-end protective layers 180 be formed, on the side surfaces of the element base 1, at least in a range surrounded by the outer leading-end protective layer 2.

<Outer Leading-End Protective Layer and Heat Insulating Space>

In the sensor element 10, the outer leading-end protective layer 2 that is a porous layer made of alumina having a purity of 99.0% or more is provided around an outermost periphery in a predetermined range from the one end portion E1 of the element base 1 having a configuration as described above.

The outer leading-end protective layer 2, however, is provided to surround the one end portion E1 of the element base 1 so that the space (heat insulating space) 4 is interposed between the outer leading-end protective layer 2 and the element base 1 as can be seen from FIG. 2. However, the outer leading-end protective layer 2 is fixed (joined) to the element base 1 only in a portion where the outer leading-end protective layer 2 is in contact with the inner leading-end protective layers 180, which is provided to be separated from the leading end portion by a predetermined distance. The heat insulating space 4 is separated from the outside only by the outer leading-end protective layer 2, which is the porous layer, and is thus not an enclosed space. Thus, gas flows in and out between the heat insulating space 4 and the outside at all times. Introduction of the measurement gas into the element base 1 (ceramic body 101) through the gas inlet 105 is naturally performed without any problems.

In the following description, a part of the heat insulating space 4 along the side surfaces of the element base 1 is referred to as a first space 4a, and a part along the leading end surface 101e is referred to as a second space 4b. In particular, a part of the first space 4a along the pump surface is also referred to as a pump surface-side space 4a1, and a part along the heater surface is also referred to as a heater surface-side space 4a2. The first space 4a and the second space 4b, however, are not independent of each other, and are contiguous to each other. That is to say, the heat insulating space 4 absolutely forms one space as a whole.

A portion of the outer leading-end protective layer 2 being in contact with the inner leading-end protective layers 180 is referred to as a fixed portion 201, a portion of the outer leading-end protective layer 2 surrounding the side surfaces of the element base 1 to form the first space 4a with the element base 1 is referred to as a side surface portion 202, and a portion of the outer leading-end protective layer 2 surrounding the leading end surface 101e of the element base 1 to form the second space 4b with the element base 1 is referred to as an end surface portion 203.

That is to say, the outer leading-end protective layer 2 is fixed to the element base 1 (specifically, to the inner lading end protective layers 180) only in the fixed portion 201 having a band shape sequentially along the side surfaces of the element base 1. A portion in which the fixed portion 201 and the element base 1 (inner leading-end protective layers 180) are in contact with each other is preferably 10% or more, in area, of a total range in which the outer leading-end protective layer 2 surrounds the element base 1. In this case, stable fixing to the element base 1 is achieved. An area ratio of the fixed portion 201 (a fixed area ratio) of less than 10% is not preferable as sufficient adhesion strength cannot be obtained. The upper limit of the fixed area ratio is determined in accordance with a minimum formation range of the heat insulating space 4 meeting a desired condition, and a fixed area ratio of 50% is sufficient in practical use.

The outer leading-end protective layer 2 is provided to surround a portion of the element base 1 in which the temperature becomes high when the gas sensor 100 is in use to thereby obtain water resistance in the portion. The outer leading-end protective layer 2 suppresses the occurrence of cracking (water-induced cracking) of the element base 1 due to thermal shock caused by local temperature reduction upon direct exposure of the portion to water. The reason why the heat insulating space 4 is interposed between the outer leading-end protective layer 2 and the element base 1 is that, even if the outer leading-end protective layer 2 is exposed to water to cause the local temperature reduction, the interposed space having a large heat capacity suitably suppresses the occurrence of the water-induced cracking caused by the action of the thermal shock on the element base 1.

The outer leading-end protective layer 2 is formed to have a thickness of 150 μm or more to 600 μm or less. The thickness of the outer leading-end protective layer 2 hereinafter refers to the thickness of the side surface portion 202 and the end surface portion 203. The side surface portion 202 and the end surface portion 203, however, may not have the same thickness. On the other hand, the thickness of the fixed portion 201 may have a greater value than that of the thickness of the side surface portion 202 as long as the fixed portion 201 does not protrude farther from the side surface portion 202 in an element thickness direction and an element width direction of the sensor element 10.

A thickness of the outer leading-end protective layer 2 of less than 150 μm is not preferable as, due to reduction in strength of the outer leading-end protective layer 2 itself, resistance to the thermal shock is reduced and water resistance is reduced, and, further, resistance to shock acting due to vibration or other factors is reduced. On the other hand, a thickness of the outer leading-end protective layer 2 of more than 600 μm is not preferable as, due to an increase in heat capacity of the outer leading-end protective layer 2, power consumption increases when the heater 150 performs heating, and, due to an increase in gas diffusion time, responsiveness of the sensor element 10 is degraded.

The outer leading-end protective layer 2 is provided so that the heat insulating space 4 has a thickness (the distance between the element base 1 and the outer leading-end protective layer 2) of 30 μm or more and 150 μm or less.

A thickness of the heat insulating space 4 of less than 30 μm is not preferable as a heat insulating effect is not suitably obtained, and water resistance is reduced. On the other hand, a thickness of the heat insulating space 4 of more than 150 μm is not preferable as stress acting on the fixed portion 201 of the outer leading-end protective layer 2 increases, and delamination and, further, detachment of the outer leading-end protective layer 2 are more likely to occur.

The outer leading-end protective layer 2 preferably has a smaller porosity than the inner leading-end protective layers 180.

When the inner leading-end protective layers 180 have a larger porosity, a so-called anchoring effect acts between the fixed portion 201 of the outer leading-end protective layer 2 and the inner leading-end protective layers 180 as the underlying layers. Due to the action of the anchoring effect, in the sensor element 10, delamination of the outer leading-end protective layer 2 from the element base 1 caused by a difference in coefficient of thermal expansion between the outer leading-end protective layer 2 and the element base 1 is more suitably suppressed when the sensor element 10 is in use.

The main surface protective layers 170 are made of alumina as with the inner leading-end protective layers 180, but have a smaller porosity and a smaller thickness than the inner leading-end protective layers 180, and thus, if the inner leading-end protective layers 180 are omitted to provide the outer leading-end protective layer 2 directly on the main surface protective layers 170, such an effect of mitigating the difference in thermal expansion as is obtained with the inner leading-end protective layers 180 cannot highly be expected.

The inner leading-end protective layers 180 adjacent to the heat insulating space 4 are formed to have a relatively large porosity of 30% to 50% as described above, and thus have a larger heat capacity than the outer leading-end protective layer 2 and the main surface protective layers 170, although it is smaller than heat capacity of the heat insulating space 4. The presence of the inner leading-end protective layers 180 contributes to suppression of the water-induced cracking as with the heat insulating space 4.

The outer leading-end protective layer 2 more preferably has a porosity of 15% to 30%. A porosity of the outer leading-end protective layer 2 of less than 15% is not preferable as a risk of clogging with poisoned substances increases, and responsiveness of the sensor element 10 is degraded. On the other hand, a porosity of more than 30% is not preferable as the strength of the outer leading-end protective layer 2 is not secured.

Furthermore, the outer leading-end protective layer 2 is provided so that the fixed portion 201 of the outer leading-end protective layer 2 and the inner leading-end protective layers 180 make a predetermined end portion angle (acute angle) θ on a side of an end portion of the heat insulating space 4. The end portion angle θ is preferably 5° to 15°. In this case, adhesion of the outer leading-end protective layer 2 to the inner leading-end protective layers 180 increases. The end portion angle θ may not necessarily be identical on each side surface, and, for example, an end portion angle θ1 on the pump surface and an end portion angle θ2 on the heater surface may have different values.

Figure 3:
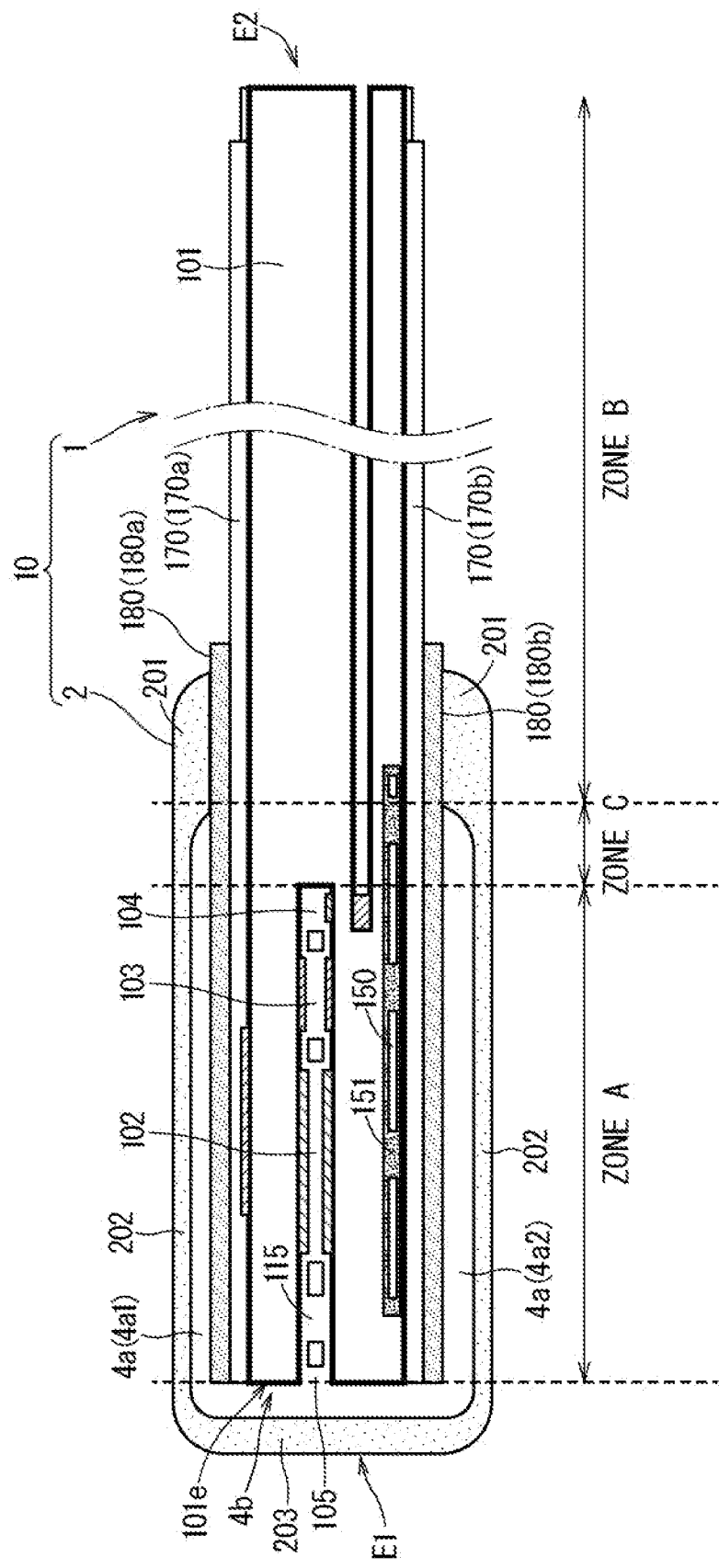
FIG. 3 is a diagram for more particularly describing specific placement locations of an outer leading-end protective layer 2 and a heat insulating space 4, and the significance thereof.

FIG. 3 is a diagram for more particularly describing specific placement locations of the outer leading-end protective layer 2 and the heat insulating space 4, and the significance thereof. As illustrated in FIG. 3, in the element base 1, three zones, that is, zones A, B, and C are conceptually defined in a longitudinal direction of the element. Placement of the outer leading-end protective layer 2 and the heat insulating space 4 is determined based on these zones.

The zone A is a region heated by the heater 150 to a temperature of 500° C. or more when the gas sensor 100 is in use. As described above, when the gas sensor 100 is in use, the sensor element 10 is heated by the heater 150 so that the temperature at least in the range from the first internal chamber 102 to the second internal chamber 103 becomes 500° C. or more. The range thus belongs to the zone A at any time. FIG. 3 illustrates a case where the zone A substantially coincides with a portion including the gas distribution part from the gas inlet 105 to the third internal chamber 104 in the longitudinal direction of the element base 1.

In contrast, the zone B is a region starting at an end portion of the fixed portion 201 in which the outer leading-end protective layer 2 is fixed to the inner leading-end protective layers 180 on the side of the one end portion E1, and ending at the other end portion E2 of the element base 1. The zone B is maintained at 500° C. or less when the gas sensor 100 is in use during which the sensor element 10 is heated by the heater 150. More specifically, in the zone B, the temperature decreases with increasing distance from the one end portion E1 of the element base 1, and a region in which the temperature becomes 500° C. is limited to the vicinity of the boundary with the zone C or A.

The zone C is a region between the zones A and B in the longitudinal direction of the element base 1. The zone C, however, is not necessarily required, and the zones A and B may be adjacent to each other.

In the sensor element 10 of the gas sensor 100 according to the present embodiment, since the fixed portion 201 in which the outer leading-end protective layer 2 is fixed to the inner leading-end protective layers 180 is included in the zone B, the heat insulating space 4 (the first space 4a and the second space 4b) is inevitably present at least around a portion of the element base 1 belonging to the zone A, including the leading end portion.

In other words, a portion of the element base 1 heated to a high temperature of 500° C. or more when the gas sensor 100 is in use is not in contact with the outer leading-end protective layer 2, and the heat insulating space 4 is surely provided around the portion. When the gas sensor 100 is in use, the side surface portion 202 and the end surface portion 203 of the outer leading-end protective layer 2 are also heated to a high temperature of 500° C. or more.

In practical use of the gas sensor 100 including the sensor element 10 in which the outer leading-end protective layer 2 and the heat insulating space 4 are provided in a manner as described above, the sensor element 10 is heated by the heater 150 so that a temperature profile in which the temperature is 500° C. or more in the zone A while the temperature is 500° C. or less in the zone B is achieved.

In this heating situation, once water vapor included in the measurement gas adheres, as water droplets, to the side surface portion 202 or the end surface portion 203 of the outer leading-end protective layer 2 belonging to the zone A, that is, the portion of the sensor element 10 heated to a high temperature of 500° C. or more is exposed to water, local and abrupt temperature reduction occurs in the adherence portion (water-exposed portion). The side surface portion 202 and the end surface portion 203 of the outer leading-end protective layer 2, however, are not in contact with the element base 1, and the heat insulating space 4 (the first space 4a and the second space 4b) having a large heat capacity is interposed between them, and thus thermal shock caused by the temperature reduction in the water-exposed portion does not occur in the element base 1. This means that the occurrence of the water-induced cracking of the sensor element 10 is suitably prevented by using the configuration in which the porous outer leading-end protective layer 2 is provided in the portion in which the temperature becomes 500° C. or more when the gas sensor 100 is in use, and the heat insulating space 4 is interposed between the outer leading-end protective layer 2 and the element base 1 as in the gas sensor 100 according to the present embodiment.

It is confirmed in advance that, even if water droplets adhere to a portion in which the temperature is 500° C. or less, abrupt temperature reduction hardly occurs, and thus thermal shock that can cause the water-induced cracking hardly occurs.

FIG. 4 illustrates an example of the relationship between the configuration of the sensor element 10 and the temperature profile of the sensor element 10 when the sensor element 10 is heated by the heater 150 in accordance with a predetermined control condition when the sensor element 10 is in use. The temperature profile shown in FIG. 4 is obtained by measuring the surface temperature on the pump surface of the sensor element 10 along the longitudinal direction of the element, and plotting it with the location of the leading end surface 101e on the side of the one end portion E1 as the origin. Thermography is used to measure the surface temperature.

In the example illustrated in FIG. 4, a range extending from the leading end of the element (one end portion E1) by a distance L1 is the zone A, and a range separated from the leading end of the element by a distance L2 or more is the zone B.

If the control condition of the heater 150 is changed, the temperature profile of the sensor element 10 changes. The properties of the sensor element 10, however, depend on the heating state, and thus the heater 150 typically performs heating so that the same temperature profile is obtained at all times, based on one control condition fixedly set in advance at the time of manufacture (typically, further, to exert the properties of the element as much as possible). The sensor element 10 is thus heated so that the steady temperature profile is obtained. Accordingly, the portion of the element base 1 heated to a temperature of 500° C. or more is the same at all times, and the ranges of the zones A, B, and C may be considered to be fixed in each sensor element 10.

Thus, having only to specify the zones and provide the outer leading-end protective layer 2 so that the heat insulating space 4 is formed in accordance with the ranges of the zones at the manufacture of the sensor element 10, the heat insulating space 4 comes to exist around the region (i.e., the zone A) every time heated by the heater 150 to a temperature of 500° C. or more during use after the manufacture.

As for numerous sensor elements 10 manufactured under the same condition, such as sensor elements 10 industrially produced in large quantities, if the sensor elements 10 are heated by the heaters 150 under the same control condition, the temperature profiles obtained from the sensor elements 10 are approximately the same as long as they are manufactured properly. Thus, having only to specify the temperature profile for a sensor element 10 extracted as a sample, and to demarcate the ranges of the zones A, B, and C based on the temperature profile, a condition for forming the outer leading-end protective layer 2 can be determined, based on the results, for all sensor elements 10 manufactured under the same condition without actually specifying the temperature profiles for all the sensor elements 10. That is to say, it is not necessary to actually obtain the temperature profiles for all the sensor elements 10, and demarcate the ranges of the zones A, B, and C based on the results.

In other words, it can be said that, for the sensor elements 10 manufactured under the same condition as described above, a region (a region to be coped with water-induced cracking) of the element base 1 is specified in advance in accordance with setting of the control condition of the heater 150, which is a region where the water-induced cracking may occur upon receipt of thermal shock caused by adherence of water droplets during use, and thus any coping with the water-induced cracking is needed. In the case of FIGS. 3 and 4, the zone A corresponds to the region. It can be said that the outer leading-end protective layer 2 surrounds a predetermined range of the element base 1 on the side of the one end portion E1 so that the heat insulating space 4 is interposed between the region to be coped with water-induced cracking and the outer leading-end protective layer 2. It can also be said that, in this case, the outer leading-end protective layer 2 is fixed to the element base 1 (to the inner leading-end protective layers 180) in a region specified in advance as a region (water-induced cracking not occurring region) in which the water-induced cracking does not occur during use. In the case of FIGS. 3 and 4, the zone B corresponds to the region.

As described above, according to the present embodiment, the outer leading-end protective layer as the porous layer is provided at least around the region to be coped with water-induced cracking specified in advance and including the range from the first internal chamber to the second internal chamber of the element base of the sensor element included in the gas sensor so that the heat insulating space is interposed between the outer leading-end protective layer and the element base. The sensor element having greater water resistance than that of a conventional sensor element can thereby be achieved. Furthermore, the inner leading-end protective layers having a larger porosity than the outer leading-end protective layer are provided on the outer periphery of the element base, and the outer leading-end protective layer is fixed to the inner leading-end protective layers in the water-induced cracking not occurring region specified in advance. Delamination and, further, detachment of the outer leading-end protective layer can thereby suitably be suppressed.

<Process of Manufacturing Sensor Element>

Figure 5:
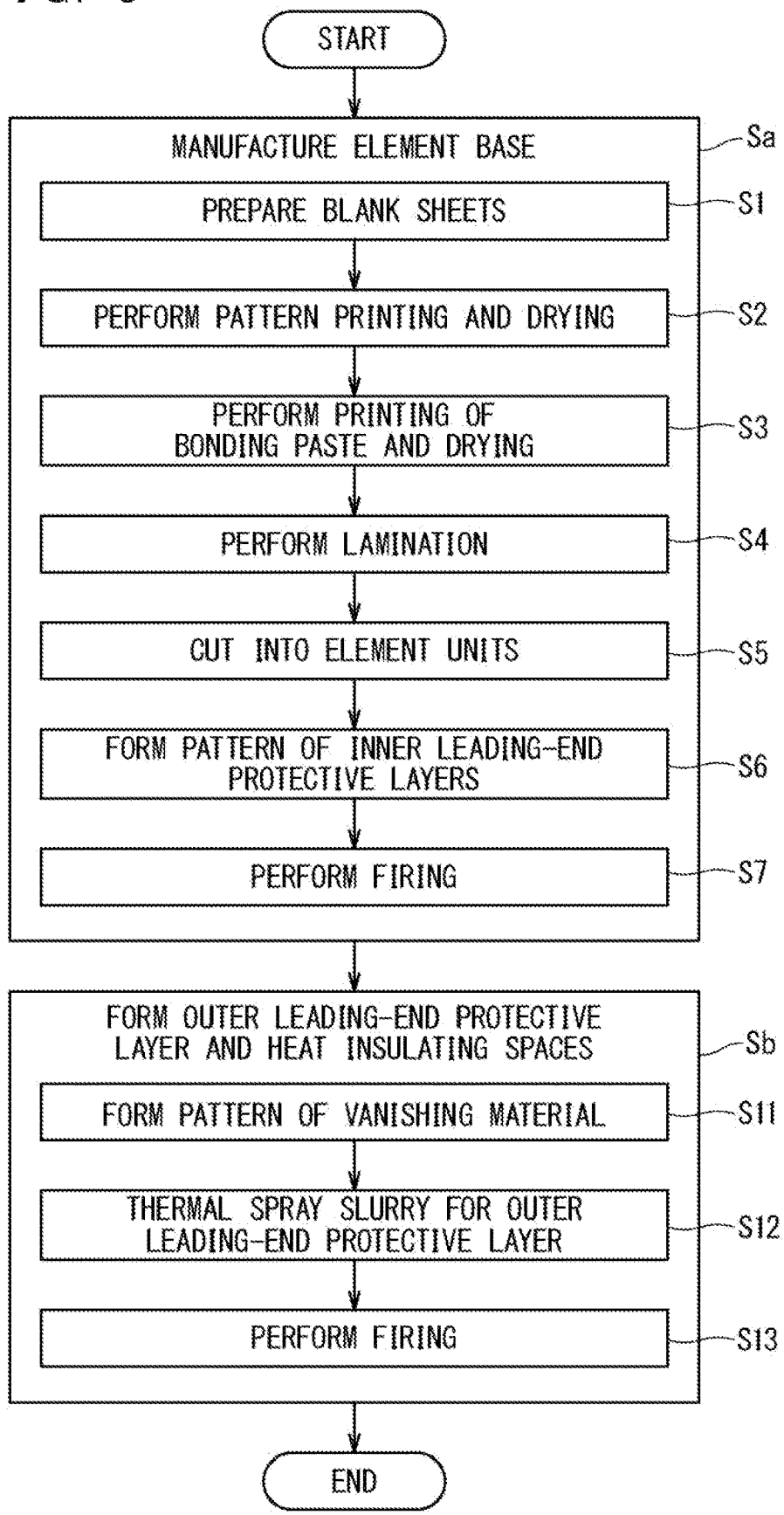
FIG. 5 is a flowchart of processing at the manufacture of the sensor element 10.

One example of a process of manufacturing the sensor element 10 having a configuration and features as described above will be described next. FIG. 5 is a flowchart of processing at the manufacture of the sensor element 10. As shown in FIG. 5, in the present embodiment, procedures for manufacturing the sensor element 10 are roughly as follows: the element base 1 including the ceramic body 101 as a laminated body of a plurality of solid electrolyte layers is manufactured using a known green sheet process (step Sa), and then the outer leading-end protective layer 2 is fixed to the element base 1 to form the heat insulating space 4 (step Sb). Accordingly, the ranges of the zones A, B, and C are supposed to be already known.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine when the sheets are in the form of the blank sheets. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material for forming the first diffusion control part 110, the second diffusion control part 120, the third diffusion control part 130, and the fourth diffusion control part 140 is also performed at the time of pattern printing.

The patterns are printed by applying pastes for pattern formation prepared in accordance with the properties required for respective formation targets onto the blank sheets using known screen printing technology. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination.

After the laminated body is obtained as described above, the laminated body is cut out at a plurality of locations to obtain unit bodies (referred to as element bodies) eventually becoming the individual element bases 1 (step S5).

Formation (application and drying) of a pattern that becomes the inner leading-end protective layers 180 on the element base 1 at completion is then performed on each of the cut out element bodies (step S6). Formation of the pattern is performed using a paste prepared in advance so that the inner leading-end protective layers 180 as desired are eventually formed.

Each of the element bodies on which the pattern that becomes the inner leading-end protective layers 180 has been formed is then fired at a firing temperature of approximately 1300° C. to 1500° C. (step S7). The element base 1 is thereby manufactured. That is to say, the element base 1 is generated by integrally firing the ceramic body 101 made of the solid electrolyte, the electrodes, the main surface protective layers 170, and the inner leading-end protective layers 180. Integral firing is performed in this manner, so that the electrodes each have sufficient adhesion strength in the element base 1.

After the element base 1 is manufactured in the above-mentioned manner, formation of the outer leading-end protective layer 2 accompanied by formation of the heat insulating space 4 is then performed on the element base 1. In the present embodiment, the heat insulating space 4 is formed using a sublimable vanishing material that disappears through firing (combustion). FIGS. 6A to 6F schematically illustrate specific procedures for forming the heat insulating space 4 and the outer leading-end protective layer 2. FIGS. 6A to 6F illustrate an example of formation on one surface of the element base 1.

First, a pattern of a sublimable vanishing material that disappears through firing (combustion) is formed in accordance with a range and the shape of the heat insulating space 4 eventually formed (step S11).

Figure 6A:
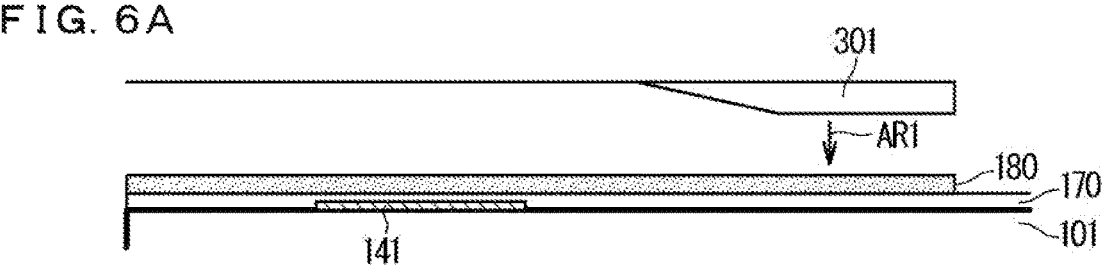
FIGS. 6A to 6F schematically illustrate specific procedures for forming the heat insulating space 4 and the outer leading-end protective layer 2.

Specifically, as illustrated in FIG. 6A, a printing plate 301 having, as printing ranges, the ranges demarcated as the zones A and C is prepared to correspond to each of the surfaces of the element base 1 on the side of the one end portion E1, and is disposed on the inner leading-end protective layers 180 as shown by an arrow AR1.

Figure 6B:
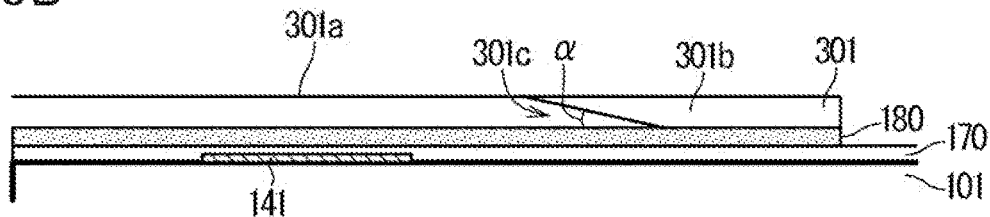

As illustrated in FIG. 6B, the printing plate 301 includes a screen mesh portion 301*a* having an opening corresponding to the shape of the heat insulating space 4 and a supporting portion 301*b* to be disposed on the inner leading-end protective layers 180 while holding the screen mesh portion 301*a* in a tensioned state. More particularly, the supporting portion 301*b* is formed to form, when disposed on the inner leading-end protective layers 180, a gap 301*c* at a predetermined angle α with the inner leading-end protective layers 180 at a location of the end portion of the heat insulating space 4 after formation of the heat insulating space 4. To obtain the end portion angle θ of 5° to 15°, it is enough that the angle α is 3° to 13°.

Figure 6C:
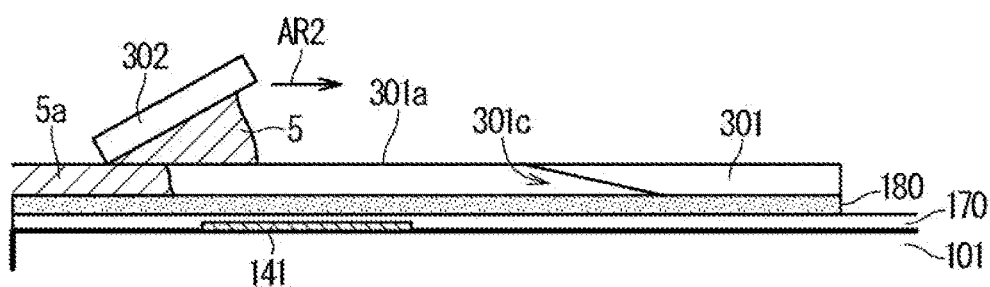
Figure 6D:
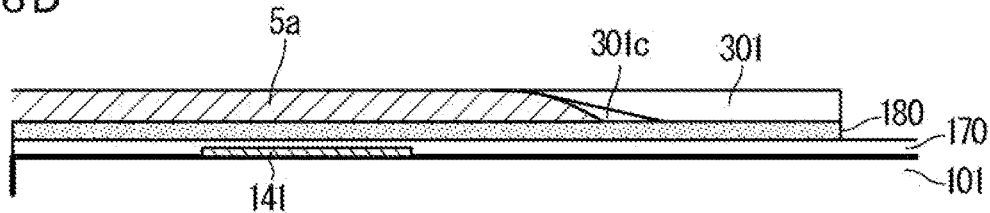

When the printing plate 301 is placed in this state, a squeegee 302 is moved as shown by an arrow AR2 in the state of a vanishing material paste 5 prepared in advance being disposed on the screen mesh portion 301*a* to sequentially form a vanishing material pattern 5*a*, as illustrated in FIG. 6C. The vanishing material pattern 5*a* is eventually formed to extend to the gap 301*c* as illustrated in FIG. 6D. The gap 301*c* may not necessarily completely be filled with the vanishing material pattern 5*a*, and the gap 301*c* may remain as illustrated in FIG. 6D as long as the end portion angle θ in the heat insulating space 4 eventually obtained has a desired value.

Figure 6E:
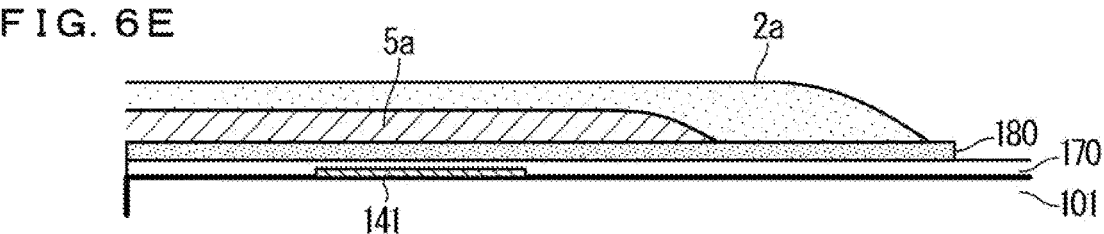

When the vanishing material pattern 5*a* is formed, the printing plate 301 is removed, and the vanishing material pattern 5*a* is dried appropriately. After formation and drying of the vanishing material pattern 5*a* on all the side surfaces and the leading end surface 101*e* of the element base 1, slurry containing a material for forming the outer leading-end protective layer 2 is thermal sprayed onto the element base 1 on which the vanishing material pattern 5*a* has been formed at a formation target location of the outer leading-end protective layer 2 (step S12). FIG. 6E illustrates the state after thermal spraying. That is to say, a thermal sprayed film 2*a* containing the material for forming the outer leading-end protective layer 2 is formed to cover the vanishing material pattern 5*a* by thermal spraying.

Figure 6F:
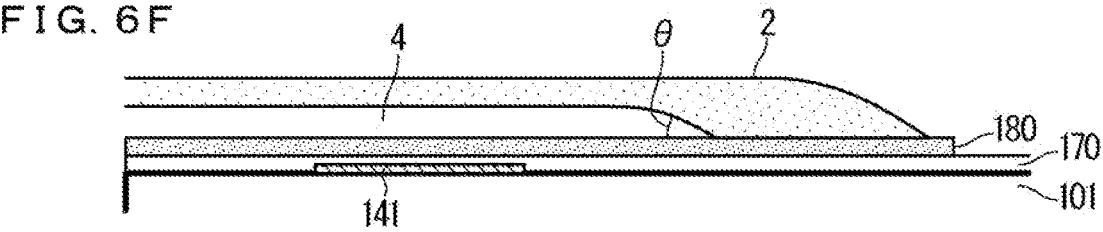

The element base 1 on which the vanishing material pattern 5*a* and the thermal sprayed film 2*a* have been formed is then fired at a firing temperature of approximately 300° C. to 600° C. (step S13). As a result, the vanishing material pattern 5*a* sublimates and disappears, and, as illustrated in FIG. 6F, the heat insulating space 4 is formed at the location where the vanishing material pattern 5*a* had been formed, and the outer leading-end protective layer 2 is formed as a result that an organic component volatilizes from the thermal sprayed film 2*a*. The sensor element 10 is thereby obtained.

The sensor element 10 thus obtained is housed in a predetermined housing, and built into the body, which is not illustrated, of the gas sensor 100.

Second Embodiment

The configuration of the sensor element for securing water resistance by interposing the heat insulating space between the outer leading-end protective layer and the element base while suppressing delamination and detachment of the outer leading-end protective layer is not limited to that shown in the first embodiment. In the present embodiment, a configuration of a sensor element 20 heated in accordance with a temperature profile shifted to a lower temperature side compared with the sensor element 10 according to the first embodiment is described.

Figure 7:
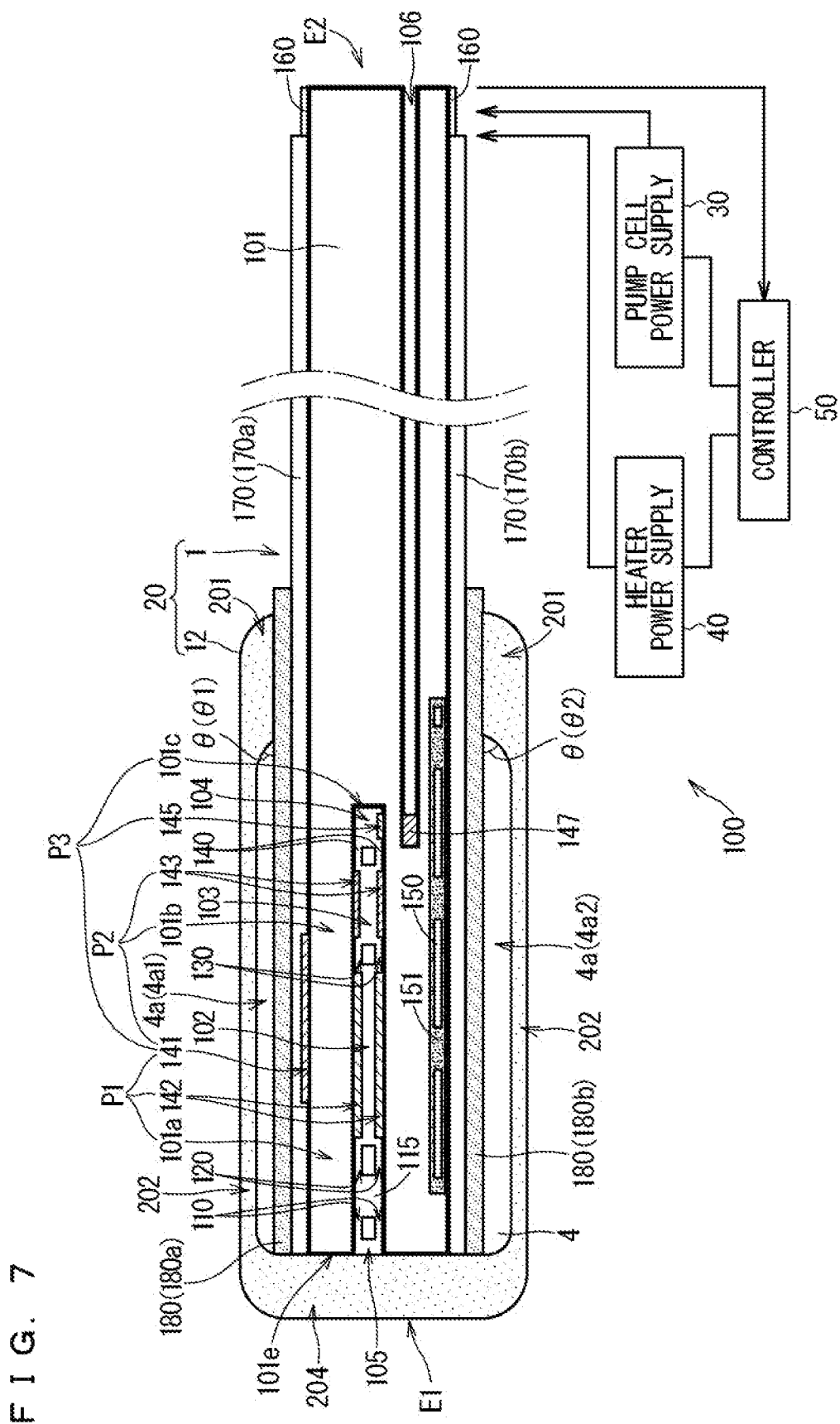
FIG. 7 is a sectional view taken along the longitudinal direction of the sensor element 20 according to a second embodiment.

FIG. 7 is a sectional view taken along the longitudinal direction of the sensor element 20 according to the second embodiment of the present invention. The sensor element 20 has components similar to those of the sensor element 10 according to the first embodiment except for some components. The similar components thus bear the same reference signs as those in the first embodiment, and detailed description thereof is omitted below.

As with the sensor element 10 according to the first embodiment, the sensor element 20 is used as a main component of the gas sensor 100, under operation control of the pump cells and the heater 150 performed through control of the pump cell power supply 30 and the heater power supply 40 performed by the controller 50, although it is not illustrated in FIG. 7. Thus, in a case where the target of measurement of the gas sensor 100 is NOx in the measurement gas, operation of the pump cells and the heater 150 of the sensor element 20 is controlled through control of the pump cell power supply 30 and the heater power supply 40 performed by the controller 50, and the NOx concentration in the measurement gas is calculated by the controller 50 based on the linear relationship between the current value (NOx signal) of the pump current Ip2 flowing through the measurement pump cell P3 under the control and the concentration of decomposed NOx.

As illustrated in FIG. 7, the sensor element 20 includes, in place of the outer leading-end protective layer 2 of the sensor element 10, an outer leading-end protective layer (first leading-end protective layer) 12 fixed to the element base 1 in a different manner from the outer leading-end protective layer 2. Specifically, the outer leading-end protective layer 12 of the sensor element 20 is similar to the outer leading-end protective layer 2 of the sensor element 10 in that the heat insulating space 4 is interposed between the outer leading-end protective layer and the side surfaces of the element base 1. The outer leading-end protective layer 12, however, is different from the outer leading-end protective layer 2 in that an end surface portion 204 is fixed to the leading end surface 101*e* of the element base 1 on the side of the one end portion E1 of the element base 1, as the end surface portion 203 of the outer leading-end protective layer 2 is separated from the element base. The heat insulating space 4 existing in the sensor element 20 is thus only the first space 4*a* interposed between the outer leading-end protective layer 12 and the side surfaces of the element base 1, and the second space 4*b* interposed in the sensor element 10 is not present. Since the outer leading-end protective layer 12 is a porous layer, introduction of the measurement gas into the element base 1 (ceramic body 101) through the gas inlet 105 is performed without any problems.

That is to say, the outer leading-end protective layer 12 of the sensor element 20 according to the present embodiment is fixed to the element base 1 in the fixed portion 201 having a band shape sequentially along the side surfaces of the element base 1 and the end surface portion 204.

As with the outer leading-end protective layer 2 of the sensor element 10, the portion in which the fixed portion 201 of the outer leading-end protective layer 12 and the element base 1 (inner leading-end protective layers 180) are in contact with each other is preferably 10% or more, in area, of the total range in which the outer leading-end protective layer 12 surrounds the element base 1. Detachment of the outer leading-end protective layer 12 as a whole is less likely to occur compared with the outer leading-end protective layer 2 due to fixing to the end surface portion 204, but a fixed area ratio of less than 10% is not preferable as with the outer leading-end protective layer 2 as adhesion strength of the fixed portion 201 cannot be secured. On the other hand, the upper limit of the fixed area ratio is determined in accordance with the minimum formation range of the heat insulating space 4 meeting the desired condition, and may have a smaller value than that in the case of the sensor element 10.

Furthermore, the end portion angle θ is preferably similar to that of the sensor element 10 in terms of securing adhesion strength of the fixed portion 201. That is to say, the end portion angle θ is preferably 5° to 15°.

The sensor element 20 having a configuration as described above can be manufactured in a similar manner to the sensor element 10 according to the first embodiment as described based on FIG. 5 and FIGS. 6A to 6F except that, due to the difference in shape of the heat insulating space 4 and the outer leading-end protective layer 12 eventually formed, the vanishing material pattern 5a is not formed on the leading end surface 101e of the element base 1, and the thermal sprayed film 2a is formed to be in contact with the leading end surface 101e.

Figure 8:
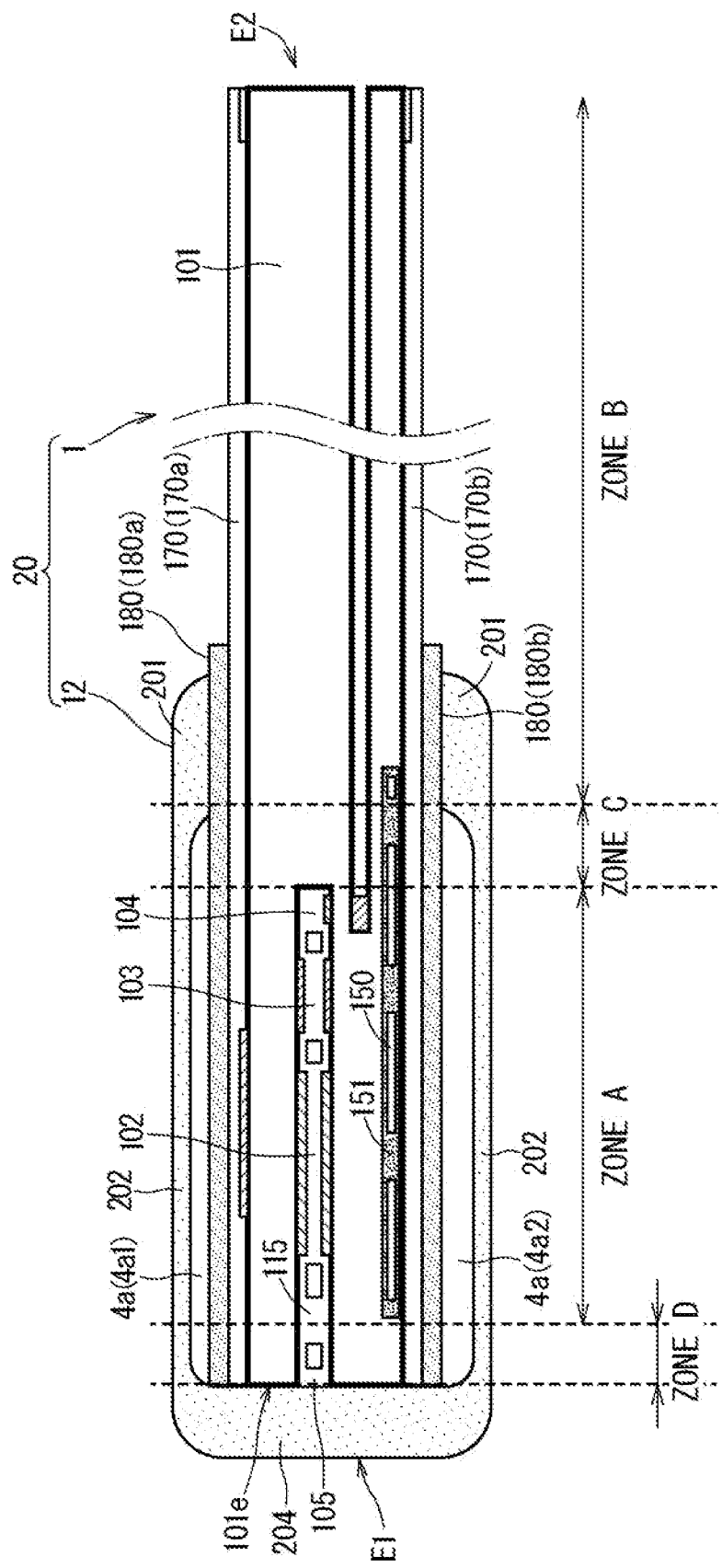
FIG. 8 is a diagram for more particularly describing specific placement locations of an outer leading-end protective layer 12 and the heat insulating space 4, and the significance thereof.

The difference between the sensor element 10 and the sensor element 20 in presence or absence of the interposed second space 4b corresponds to the difference between them in temperature profile when the gas sensor 100 is in use. As described above, the sensor element 20 according to the present embodiment is assumed to be used in accordance with the temperature profile shifted to the lower temperature side compared with the sensor element 10 according to the first embodiment. Description is made on this point based on FIG. 8. FIG. 8 is a diagram for more particularly describing specific placement locations of the outer leading-end protective layer 12 and the heat insulating space 4, and the significance thereof, similarly to FIG. 3.

In the sensor element 20, placement of the outer leading-end protective layer 12 and the heat insulating space 4 is determined based on zones dividing the element base 1 as in the sensor element 10. As illustrated in FIG. 8, the sensor element 20 has the zones A, B, and C as with the sensor element 10. Definitions of these zones are the same as those in the sensor element 10. That is to say, the zone A is the region at least including the range from the first internal chamber 102 to the second internal chamber 103, and heated by the heater 150 to a temperature of 500° C. or more when the gas sensor 100 is in use. The zone B is the region starting at the end portion of the fixed portion 201 in which the outer leading-end protective layer 12 is fixed to the inner leading-end protective layers 180 on the side of the one end portion E1, and ending at the other end portion E2 of the element base 1, and maintained at 500° C. or less when the gas sensor 100 is in use. The zone C is the region between the zones A and B in the longitudinal direction of the element base 1.

While the zone A reaches the gas inlet 105 in the sensor element 10 illustrated in FIG. 3, a predetermined range extending from the gas inlet 105 is classified as a zone D different from the zone A in the sensor element 20 illustrated in FIG. 8.

The zone D is a region maintained at 500° C. or less when the gas sensor 100 is in use on the side of the one end portion E1 of the sensor element 20. In other words, when the gas sensor 100 including the sensor element 20 is in use, the sensor element 20 is heated by the heater 150 provided inside the sensor element 20 so that the temperature profile in which the zone D is formed in addition to the zones A to C is achieved.

In the sensor element 20, the heat insulating space 4 (first space 4a) is inevitably present at least around the portion of the element base 1 belonging to the zone A as in the sensor element 10. Thus, once the portion belonging to the zone A and heated to a high temperature of 500° C. or more is exposed to water when the gas sensor 100 is in use, local and abrupt temperature reduction occurs in the water-exposed portion, but thermal shock caused by the temperature reduction in the water-exposed portion does not occur in the element base 1. This is because the side surface portion 202 of the outer leading-end protective layer 12 is not in contact with the element base 1 and the heat insulating space 4 (first space 4a) having a large heat capacity is interposed between them.

This is also as in the sensor element 10 that, even if water droplets adhere to the portion in which the temperature is 500° C. or less when the gas sensor 100 is in use, abrupt temperature reduction hardly occurs, and thus thermal shock that may cause the water-induced cracking hardly occurs. In the sensor element 20, such a portion in which the temperature is 500° C. or less during use is present not only in the zone B on the side of the other end portion E2, but also in the zone D on the side of the one end portion E1.

A suitable range of the thickness and the porosity of the outer leading-end protective layer 12 is similar to that of the outer leading-end protective layer 2 of the sensor element 10. The thickness of the heat insulating space 4 is also similar to that of the sensor element 10.

Figure 9:
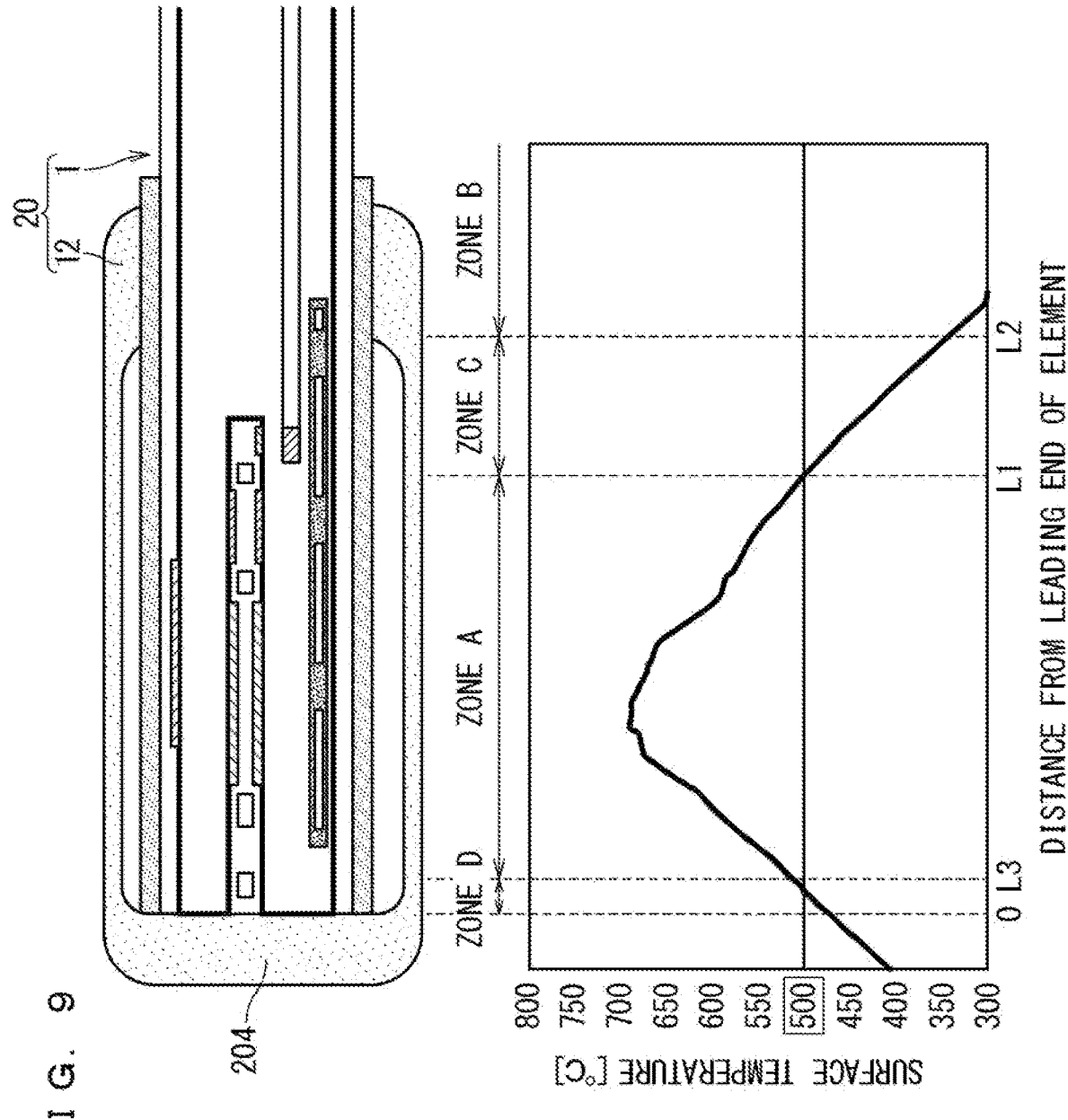
FIG. 9 illustrates an example of the relationship between a configuration of the sensor element 20 and a temperature profile of the sensor element 20 when the sensor element 20 is heated by the heater 150 in accordance with a predetermined control condition when the sensor element 20 is in use.

FIG. 9 illustrates an example of the relationship between the configuration of the sensor element 20 and the temperature profile of the sensor element 20 when the sensor element 20 is heated by the heater 150 in accordance with a predetermined control condition when the sensor element 20 is in use. The temperature profile shown in FIG. 9 is obtained by measuring the surface temperature on the pump surface of the sensor element 20 along the longitudinal direction of the element, and plotting it with the location of the leading end surface 101e on the side of the one end portion E1 as the origin. Thermography is used to measure the surface temperature.

In the example illustrated in FIG. 9, a range extending from the leading end of the element (one end portion E1) by a distance L3 is the zone D, and a range adjacent to the range and extending from the location of the distance L3 to the location of the distance L1 is the zone A, in contrast to the case of FIG. 4. A range separated from the leading end of the element by the distance L2 or more is the zone B.

Also in the sensor element 20, having only to specify the zones and provide the outer leading-end protective layer 12 so that the heat insulating space 4 is formed in accordance with the ranges of the zones at the manufacture of the sensor element 20, the heat insulating space 4 comes to exist around the region (i.e., the zone A) every time heated by the heater 150 to a temperature of 500° C. or more during use after the manufacture.

As in the sensor element 10, as for numerous sensor elements 20 manufactured under the same condition, such as sensor elements 20 industrially produced in large quantities, having only to specify the temperature profile for a sensor element 20 extracted as a sample, and to demarcate the ranges of the zones A, B, C, and D based on the temperature profile, a condition for forming the outer leading-end protective layer 12 can be determined, based on the results, for all sensor elements 20 manufactured under the same condition without actually specifying the temperature profiles for all the sensor elements 20. That is to say, it is not necessary to actually obtain the temperature profiles for all the sensor elements 20, and demarcate the ranges of the zones A, B, C, and D based on the results.

In other words, it can be said that, for the sensor elements 20 manufactured under the same condition as described above, the region to be coped with water-induced cracking of the element base 1 is specified in advance in accordance with setting of the control condition of the heater 150, as in the sensor element 10. In the case of FIGS. 8 and 9, the zone A corresponds to the region. The sensor element 20, however, differs from the sensor element 10 in that such a region exists only in a part of the side surfaces of the element base 1. It can be said that the outer leading-end protective layer 12 surrounds a predetermined range of the element base 1 on the side of the one end portion E1 so that the heat insulating space 4 is interposed between the region to be coped with water-induced cracking and the outer leading-end protective layer 12. In this case, the outer leading-end protective layer 12 is fixed to the element base 1 (to the inner leading-end protective layers 180) in the water-induced cracking not occurring region on the side surfaces of the element base 1 as in the sensor element 10. In the case of FIGS. 8 and 9, the zone B corresponds to the region. The sensor element 20, however, differs from the sensor element 10 in that the outer leading-end protective layer 12 is further fixed to the leading end surface 101e of the element base 1.

Also in a case where the temperature on the side of the one end portion E1 becomes 500° C. or less as in the sensor element 20 of FIG. 9, the outer leading-end protective layer 2 may be provided so that the second space 4b is interposed between the outer leading-end protective layer 2 and the element base 1 as in the sensor element 10 according to the first embodiment. This is because the heat insulating space 4 is still present around the zone A.

As described above, in the present embodiment, the outer leading-end protective layer as the porous layer is provided at least around the region to be coped with water-induced cracking specified in advance and including the range from the first internal chamber to the second internal chamber of the element base of the sensor element included in the gas sensor so that the heat insulating space is interposed between the outer leading-end protective layer and the element base as in the first embodiment. The sensor element having great water resistance can thereby be achieved.

Furthermore, the inner leading-end protective layers having a larger porosity than the outer leading-end protective layer are provided on the outer periphery of the element base, and the outer leading-end protective layer is fixed to the inner leading-end protective layers in the water-induced cracking not occurring region specified in advance. In addition, the outer leading-end protective layer is fixed to the element base in the leading end portion of the element. Delamination and, further, detachment of the outer leading-end protective layer can thereby more surely and suitably be suppressed compared with the first embodiment.

<Modifications>

The above-mentioned embodiments are targeted at a sensor element having three internal chambers, but the sensor element may not necessarily have a three-chamber configuration. That is to say, the configuration in which the inner leading-end protective layers having a large porosity are provided on outermost surfaces of the element base on the side of the end portion at least including the gas distribution part, and, further, the outer leading-end protective layer as the porous layer having a smaller porosity than the inner leading-end protective layers is provided outside the inner leading-end protective layers so that the (heat insulating) space is interposed between the outer leading-end protective layer and the portion of the element base in which the temperature becomes 500° C. or more during use is applicable to a sensor element having one internal chamber or two internal chambers.

In the above-mentioned embodiments, the region heated to a temperature of 500° C. or more during use is set to the region to be coped with water-induced cracking on the premise of the configuration of the sensor element illustrated in FIG. 2 or 7, but the heating temperature of the region considerable as a target of the region to be coped with water-induced cracking may vary depending on the configuration of the sensor element.

Examples (Test 1)

As the sensor element 10 according to the first embodiment, six types of sensor elements 10 (Examples 1 to 6) having different combinations of thicknesses of the first space 4a of the heat insulating space 4 and thicknesses of the outer leading-end protective layer 2 (thicknesses of the side surface portion 202 and the end surface portion 203) were manufactured, and a test of water resistance was conducted on them.

As comparative examples, a sensor element (Comparative Example 1) in which the outer leading-end protective layer 2 as a whole adhered to the element base 1 without the heat insulating space 4 being interposed therebetween and a sensor element (Comparative Example 2) in which the outer leading-end protective layer 2 was not provided to expose the element base 1 were manufactured, and a similar test was conducted on them.

Table 1 lists the presence or absence of the first space 4a, the thickness of the first space 4a, the thickness of the outer leading-end protective layer 2, and the results of determination in the water resistance test for each sensor element. The element bases 1 of all the sensor elements were manufactured under the same condition. The sensor elements according to Examples 1 to 6 were each set to have a fixed area ratio of 30%, an end portion angle θ of 10°, and a thickness of the second space 4b identical to the thickness of the first space.

TABLE 1

| LEVEL | PRESENCE OR ABSENCE OF FIRST SPACE | THICKNESS OF FIRST SPACE [μm] | THICKNESS OF OUTER LEADING-END PROTECTIVE LAYER [μm] | DETERMINATION 1 |
|---|---|---|---|---|
| EXAMPLE 1 | PRESENT | 100 | 300 | ⊚ |
| EXAMPLE 2 | PRESENT | 50 | 150 | ⊚ |
| EXAMPLE 3 | PRESENT | 30 | 200 | ⊚ |
| EXAMPLE 4 | PRESENT | 20 | 200 | ○ |
| EXAMPLE 5 | PRESENT | 150 | 200 | ⊚ |

TABLE 1-continued

| LEVEL | PRESENCE OR ABSENCE OF FIRST SPACE | THICKNESS OF FIRST SPACE [μm] | THICKNESS OF OUTER LEADING-END PROTECTIVE LAYER [μm] | DETERMINATION 1 |
|---|---|---|---|---|
| EXAMPLE 6 | PRESENT | 50 | 100 | ○ |
| COMPARATIVE EXAMPLE 1 | ABSENT | — | 300 | X |
| COMPARATIVE EXAMPLE 2 | ABSENT | — | — | X |

The water resistance test was conducted by the following procedures: First, the heater 150 was energized to heat the sensor element 10 so that a temperature profile in which a maximum temperature in the zone A was 800° C., and the temperature in the zone B was 500° C. or less was obtained. In the temperature profile, the range from the gas inlet 105 to the third internal chamber 104 in the longitudinal direction of the element belonged to the zone A.

While the heating state was maintained, the pump cells and, further, the sensor cells of the sensor element were operated in ambient atmosphere to perform control so that oxygen concentration in the first internal chamber 102 was maintained at a predetermined constant value to thereby obtain a situation in which a pump current Ip0 in the main pump cell P1 was stabilized.

Under the situation, a predetermined amount of water was dropped onto the side surface portion 202 of the outer leading-end protective layer 2 belonging to the zone A (onto a corresponding portion of the element base 1 in Comparative Example 2), and whether a change of the pump current Ip0 before and after dropping exceeded a predetermined threshold was determined. If the change of the pump current Ip0 did not exceed the threshold, the amount of dropped water was increased to repeat the determination. The amount of dropped water when the change of the pump current Ip0 eventually exceeded the threshold was defined as a cracking occurring dropped water amount, and water resistance or a lack thereof was determined based on the magnitude of a value of the cracking occurring dropped water amount. Determination in this manner was referred to as Determination 1. A maximum value of the amount of dropped water was set to 25 μL.

In this test, the change of the pump current Ip0 was used as a criterion for determining the occurrence of cracking in the element base 1. This utilizes such a causal relationship that, when cracking of the element base 1 occurs due to thermal shock caused by dropping (adherence) of water droplets onto the outer leading-end protective layer 2, oxygen flows into the first internal chamber 102 through a portion of the cracking, and the value of the pump current Ip0 increases.

Specifically, the sensor element was determined to have great water resistance if the cracking occurring dropped water amount was 20 μL or more. The sensor element was determined to have water resistance in a range allowable in practical use if the cracking occurring dropped water amount was 10 μL or more and less than 20 μL. The sensor element was determined to have insufficient water resistance in terms of practicality if the cracking occurring dropped water amount was less than 10 μL. The value of 10 μL is a maximum value of an evaluation value of the amount of water exposure test disclosed in Japanese Patent Application Laid-Open No. 2015-87161. In Japanese Patent Application Laid-Open No. 2016-48230, a case where cracking does not occur with an amount of dropped water of 3 μL is determined as an example. If the cracking occurring dropped water amount is 10 μL or more, the sensor element is thus determined to have greater water resistance than that of a conventional sensor element.

In the sensor element including the outer leading-end protective layer 2, delamination of the outer leading-end protective layer 2 in the fixed portion 201 did not occur until cracking of the element base 1 occurred.

In Table 1, as the results of Determination 1, a double circle is marked for the sensor element in which the cracking occurring dropped water amount is 20 μL or more or cracking does not occur upon dropping of a maximum amount of water, a single circle is marked for the sensor element in which the cracking occurring dropped water amount is 10 μL or more and less than 20 μL, and a cross is marked for the sensor element in which the cracking occurring dropped water amount is less than 10 μL.

According to the results shown in Table 1, the sensor elements in Examples 1 to 6 are each marked with the double circle or the single circle, whereas the sensor elements in Comparative Examples 1 and 2 are each marked with the cross. It was determined that cracking occurred in the sensor element in Comparative Example 1 with an amount of dropped water of 5 μL to 9 μL. It was also determined that cracking occurred in the sensor element in Comparative Example 2 with an amount of dropped water of less than 1 μL.

The results shown in Table 1 indicate that the sensor element having greater water resistance than that of the conventional sensor element can be achieved by providing the outer leading-end protective layer as the porous layer having a thickness of 150 μm or more and 600 μm or less at least around the portion of the element base of the sensor element included in the gas sensor heated to a high temperature of 500° C. or more when the gas sensor is in use so that a heat insulating space having a thickness of 30 μm or more and 150 μm or less is interposed between the outer leading-end protective layer and the element base as in the first embodiment, for example.

(Test 2)

A test was conducted to determine the influence, on water resistance, of the relationship between the region to be coped with water-induced cracking and placement locations of the heat insulating space 4 and the outer leading-end protective layer 2. The test should originally be conducted by providing, for element bases heated in accordance with the same temperature profile, the outer leading-end protective layers 2 at different locations. In the following description, however, as for the sensor element according to the first embodiment, a plurality of sensor elements having a thickness of the heat insulating space 4 of 100 μm, a thickness of the outer leading-end protective layer 2 of 300 μm, a fixed area ratio of 30%, and an end portion angle θ of 10° manufactured under the same condition were prepared, and heated by the heater 150 under intentionally different heating conditions to obtain four combinations (Examples 7 to 10) of temperature distributions in the sensor element and placement locations of the heat insulating space 4 and the outer leading-end protective layer 2, for ease of preparation.

On the other hand, as for the sensor element according to the second embodiment, one type of sensor element (Example 11) in which the outer leading-end protective layer 12 was provided so that the heat insulating space 4 did not include the second space 4b was prepared. The sensor element was set to have a similar thickness of the heat insulating space 4, a similar thickness of the outer leading-end protective layer 12, a similar fixed area ratio, and a similar end portion angle θ to those in Examples 7 to 10.

As comparative examples, a plurality of sensor elements in each of which the outer leading-end protective layer having a thickness of 300 µm as a whole adhered to the element base 1 without the heat insulating space 4 being interposed therebetween were prepared, and heated by the heater 150 under intentionally different heating conditions to obtain three types (Comparative Examples 3 to 5) of temperature distributions in the sensor elements.

Table 2 lists, for each sensor element, the presence or absence of the first space 4a, the surface temperature of the sensor element in the middle of a portion in which the heat insulating space 4 (first space 4a) is interposed between the side surface portion of the outer leading-end protective layer and the element base ("FIRST SPACE INTERPOSED PORTION TEMPERATURE" in Table 2), the surface temperature of the sensor element in the vicinity of the fixed portion of the outer leading-end protective layer on the side of the one end portion ("FIRST SPACE NOT-INTERPOSED PORTION TEMPERATURE" in Table 2), the presence or absence of the second space 4b, the surface temperature on the side of the one end portion E1 ("ELEMENT LEADING END PORTION TEMPERATURE" in Table 2), and the results of determination in the water resistance test. For each of the sensor elements in comparative examples in which there was no heat insulating space, the surface temperature of a corresponding portion was measured. The surface temperature was measured by thermography. The element bases 1 of all the sensor elements were manufactured under the same condition.

The water resistance test was conducted by the same procedures as those in Test 1 except that water was dropped at three locations. The first dropping location was the same as that in Test 1. The second dropping location was the fixed portion 201 (a corresponding portion of the outer leading-end protective layer in each of Comparative Examples 3 to 5). The third dropping location was the end surface portion 203 or 204 on the side of the one end portion E1 (a corresponding portion of the outer leading-end protective layer in each of Comparative Examples 3 to 5).

Determination of water resistance or a lack thereof at each dropping location was similar to that in Test 1. In Table 2, determination at the first dropping location, determination at the second dropping location, and determination at the third dropping location are respectively shown as "DETERMINATION 1", "DETERMINATION 2", and "DETERMINATION 3".

According to the results shown in Table 2, the sensor elements in Examples 7 to 11 are marked with the double circle or the single circle in each of Determination 1 to Determination 3, whereas the sensor elements in Comparative Examples 3 to 5 are marked with the cross except that the sensor elements in Comparative Examples 3 and 5 are respectively marked with the double circle and the single circle in Determination 2.

The results indicate that good water resistance can be obtained in the portion in which the outer leading-end protective layer is provided as a whole in a case where the outer leading-end protective layer is provided at least in the portion of the sensor element in which the temperature becomes 500° C. or more during use so that the heat insulating space 4 is interposed between the outer leading-end protective layer and the element base 1, and the temperature in the fixed portion in which the outer leading-end protective layer is fixed to the element base is maintained at 500° C. or less.

On the other hand, the results indicate that, in a case where the heat insulating space 4 is not provided in the sensor element, water resistance is secured in the portion in which the temperature is maintained at 500° C. or less during use, but good water resistance cannot be obtained in the portion in which the temperature becomes a high temperature of 500° C. or more.

The above-mentioned results show the effectiveness of the heat insulating space provided to correspond to the region to be coped with water-induced cracking.

TABLE 2

| LEVEL | PRESENCE OR ABSENCE OF FIRST SPACE | FIRST SPACE INTERPOSED PORTION TEMPERATURE [° C.] | FIRST SPACE NOT-INTERPOSED PORTION TEMPERATURE [° C.] | PRESENCE OR ABSENCE OF SECOND SPACE | ELEMENT LEADING END PORTION TEMPERATURE [° C.] | DETERMINATION 1 | DETERMINATION 2 | DETERMINATION 3 |
| --- | --- | --- | --- | --- | --- | --- | --- | --- |
| EXAMPLE 7 | PRESENT | 850 | 500 | PRESENT | 800 | ○ | ○ | ○ |
| EXAMPLE 8 | PRESENT | 700 | 350 | PRESENT | 650 | ◎ | ◎ | ○ |
| EXAMPLE 9 | PRESENT | 750 | 450 | PRESENT | 700 | ○ | ○ | ○ |
| EXAMPLE 10 | PRESENT | 700 | 350 | PRESENT | 500 | ◎ | ◎ | ◎ |
| EXAMPLE 11 | PRESENT | 650 | 350 | ABSENT | 450 | ◎ | ◎ | ○ |
| COMPARATIVE EXAMPLE 3 | ABSENT | 650 | 350 | ABSENT | 600 | X | ◎ | X |
| COMPARATIVE EXAMPLE 4 | ABSENT | 800 | 600 | ABSENT | 750 | X | X | X |
| COMPARATIVE EXAMPLE 5 | ABSENT | 850 | 450 | ABSENT | 800 | X | ○ | X |

While the invention has been shown and described in detail, the foregoing description is in all aspects illustrative and not restrictive. It is therefore understood that numerous modifications and variations can be devised without departing from the scope of the invention.

What is claimed is:

1. A sensor element for a gas sensor detecting a predetermined gas component in a measurement gas, said sensor element comprising:
    an element base including:
        an elongated planar ceramic body made of an oxygen-ion conductive solid electrolyte, and having a gas inlet at one end portion thereof;
        at least one internal chamber located inside said ceramic body, and communicating with said gas inlet under predetermined diffusion resistance;
        at least one electrochemical pump cell including an outer pump electrode located on an outer surface of said ceramic body, an inner pump electrode located to face said at least one internal chamber, and a solid electrolyte located between said outer pump electrode and said inner pump electrode, said at least one electrochemical pump cell pumping in and out oxygen between said at least one internal chamber and an outside;
        a heater buried in a predetermined range on a side of said one end portion of said ceramic body; and
        a first region in which water-induced cracking is to be prevented defined in said element base on the side of said one end portion;
    a first leading-end protective layer being porous, and surrounding a first range at least including a leading end surface and said first region of said element base on the side of said one end portion; and
    a second leading-end protective layer being porous, having a larger porosity than said first leading-end protective layer, and located on four side surfaces and four corners of said element base at least in said first range, wherein
    an end portion of said first leading-end protective layer opposite said one end portion is a fixed portion in which said first leading-end protective layer is fixed to said second leading-end protective layer,
    said first leading-end protective layer is further fixed to said leading end surface of said element base on the side of said one end portion, and
    a single heat insulating space is interposed between said first leading-end protective layer and said four side surfaces and four corners of said element base to surround said four side surfaces and four corners of said element base and said second leading-end protective layer in said first range surrounded by said first leading-end protective layer.

2. The sensor element according to claim 1, wherein said first region is a region of said element base heated to 500° C. or more when said gas sensor is in use.

3. The sensor element according to claim 2, wherein a second region where water-induced cracking is to be prevented is defined in said element base, and said fixed portion is located in said second region.

4. The sensor element according to claim 3, wherein said fixed portion is located in a second range of said element base maintained at 500° C. or less when said gas sensor is in use.

5. The sensor element according to claim 2, wherein said first leading-end protective layer has a porosity of 15% or more and 30% or less, and said second leading-end protective layer has a porosity of 30% or more and 50% or less.

6. The sensor element according to claim 2, wherein a portion in which said fixed portion of said first leading-end protective layer is in contact with said second leading-end protective layer is 10% or more and 50% or less, in area, of said first range.

7. The sensor element according to claim 1, wherein said first leading-end protective layer has a thickness of 150 μm or more and 600 μm or less.

8. The sensor element according to claim 7, wherein a second region where water-induced cracking is to be prevented is defined in said element base, and said fixed portion is located in said second region.

9. The sensor element according to claim 8, wherein said fixed portion is located in a second range of said element base maintained at 500° C. or less when said gas sensor is in use.

10. The sensor element according to claim 7, wherein said first leading-end protective layer has a porosity of 15% or more and 30% or less, and said second leading-end protective layer has a porosity of 30% or more and 50% or less.

11. The sensor element according to claim 7, wherein a portion in which said fixed portion of said first leading-end protective layer is in contact with said second leading-end protective layer is 10% or more and 50% or less, in area, of said first range.

12. The sensor element according to claim 1, wherein said single heat insulating space has a thickness of 30 μm or more and 150 μm or less.

13. The sensor element according to claim 12, wherein a second region where water-induced cracking is to be prevented is defined in said element base, and said fixed portion is located in said second region.

14. The sensor element according to claim 13, wherein said fixed portion is located in a second range of said element base maintained at 500° C. or less when said gas sensor is in use.

15. The sensor element according to claim 12, wherein said first leading-end protective layer has a porosity of 15% or more and 30% or less, and said second leading-end protective layer has a porosity of 30% or more and 50% or less.

16. The sensor element according to claim 12, wherein a portion in which said fixed portion of said first leading-end protective layer is in contact with said second leading-end protective layer is 10% or more and 50% or less, in area, of said first range.

17. The sensor element according to claim 1, wherein a second region where water-induced cracking is to be prevented is defined in said element base, and said fixed portion is located in said second region.

18. The sensor element according to claim 17, wherein said fixed portion is located in a second range of said element base maintained at 500° C. or less when said gas sensor is in use.

19. The sensor element according to claim 1, wherein said first leading-end protective layer has a porosity of 15% or more and 30% or less, and said second leading-end protective layer has a porosity of 30% or more and 50% or less.

20. The sensor element according to claim 1, wherein a portion in which said fixed portion of said first leading-end protective layer is in contact with said second leading-end protective layer is 10% or more and 50% or less, in area, of said first range.

* * * * *